（12）United States Patent
Bender et al.

(10) Patent No.: US 11,536,370 B2
(45) Date of Patent: Dec. 27, 2022

(54) BELLOWS SEAL ASSEMBLY

(71) Applicant: Eaton Intelligent Power Limited, Dublin (IE)

(72) Inventors: Steven Bender, Attleboro, MA (US); Jeffrey Lavin, Mattapoisett, MA (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 17/100,678

(22) Filed: Nov. 20, 2020

(65) Prior Publication Data

US 2021/0156472 A1 May 27, 2021

Related U.S. Application Data

(60) Provisional application No. 62/941,607, filed on Nov. 27, 2019.

(51) Int. Cl.
*F16J 15/16* (2006.01)
(52) U.S. Cl.
CPC .................... *F16J 15/164* (2013.01)

(58) Field of Classification Search
CPC ........ F16J 15/164; F16J 15/34; F16J 15/3436; F16J 15/344; F16J 15/345
See application file for complete search history.

(56) References Cited

U.S. PATENT DOCUMENTS

| | | | | |
|---|---|---|---|---|
| 3,372,939 A | * | 3/1968 | Coulombe | F16J 15/36 277/916 |
| 3,515,394 A | * | 6/1970 | Bickford | F16J 15/366 277/916 |
| 5,901,965 A | * | 5/1999 | Ringer | F16J 15/363 277/389 |
| 8,231,130 B2 | * | 7/2012 | Takahashi | F16J 15/363 277/389 |
| 8,714,558 B2 | | 5/2014 | Berard | |
| 2009/0085300 A1 | * | 4/2009 | Takahashi | F16J 15/348 277/391 |
| 2012/0080851 A1 | * | 4/2012 | Berard | F16J 15/366 277/358 |

* cited by examiner

*Primary Examiner* — Gilbert Y Lee
(74) *Attorney, Agent, or Firm* — Merchant & Gould P.C.

(57) ABSTRACT

The present disclosure provides an improved bellows type seal. In the present disclosure, the bellows of the seal dampen resulting in the seal having a longer useful life and can withstand higher loads. The seal includes a damper assembly that includes a spring and a band that are engaged on the exterior of a bellows for dampening vibrations.

23 Claims, 6 Drawing Sheets

BELLOWS SEAL ASSEMBLY

CROSS-REFERENCE TO RELATED APPLICATIONS

This application claims priority to U.S. Provisional Application No. 62/941,607 filed on Nov. 27, 2019, the entire disclosure of which is hereby expressly incorporated herein by reference.

TECHNICAL FIELD

Mechanical seal assemblies and related methods of manufacturing mechanical seals.

BACKGROUND

There exits numerous applications for mechanical seals including, but not limited to, auxiliary power units, compressors, power generating gas turbines, aircraft engines, engine starters, fuel controls, gearboxes, engine accessories, nuclear valves, production machinery equipment, off-road vehicles, and turbochargers. Mechanical seals allows for relative movement between two structures while maintaining fluid separation at the interface between the structures. For example, a shaft may extend from and rotate relative to a stationary housing. It may be desirable to have pressurized oil in the housing and prevent it from leaking out of the housing. A mechanical seal can be positioned at the interface between the shaft and the housing to contain the oil in the housing and allow for the relative motion between the shaft and housing.

Mechanical seals come in a variety of configurations. One type of mechanical seal is a bellows type seal. Bellows type seals are commonly used to enable a shaft to rotate relative to a housing from which it extends. Often, the bellows seals have a heat resistant construction. In such configurations, the seals are particularly suited for applications involving heat generation or in highly caustic fluid media conditions. Certain types of bellows seals are further described in U.S. Pat. No. 8,714,558, which is incorporated by reference herein in its entirety. Additional advancement in seal technology that extends the life and overall performance of bellows type seals is desirable.

SUMMARY

The present disclosure provides an improved bellows type seal. The bellows seal of the present disclosure includes damper assembly that dampens the bellows thereby resulting in the seal having a longer useful life under higher loads. In the depicted embodiment, the damper assembly includes a spring and band configuration that is engaged on the exterior of a bellows to dampening vibrations in the bellows.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following Detailed Description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
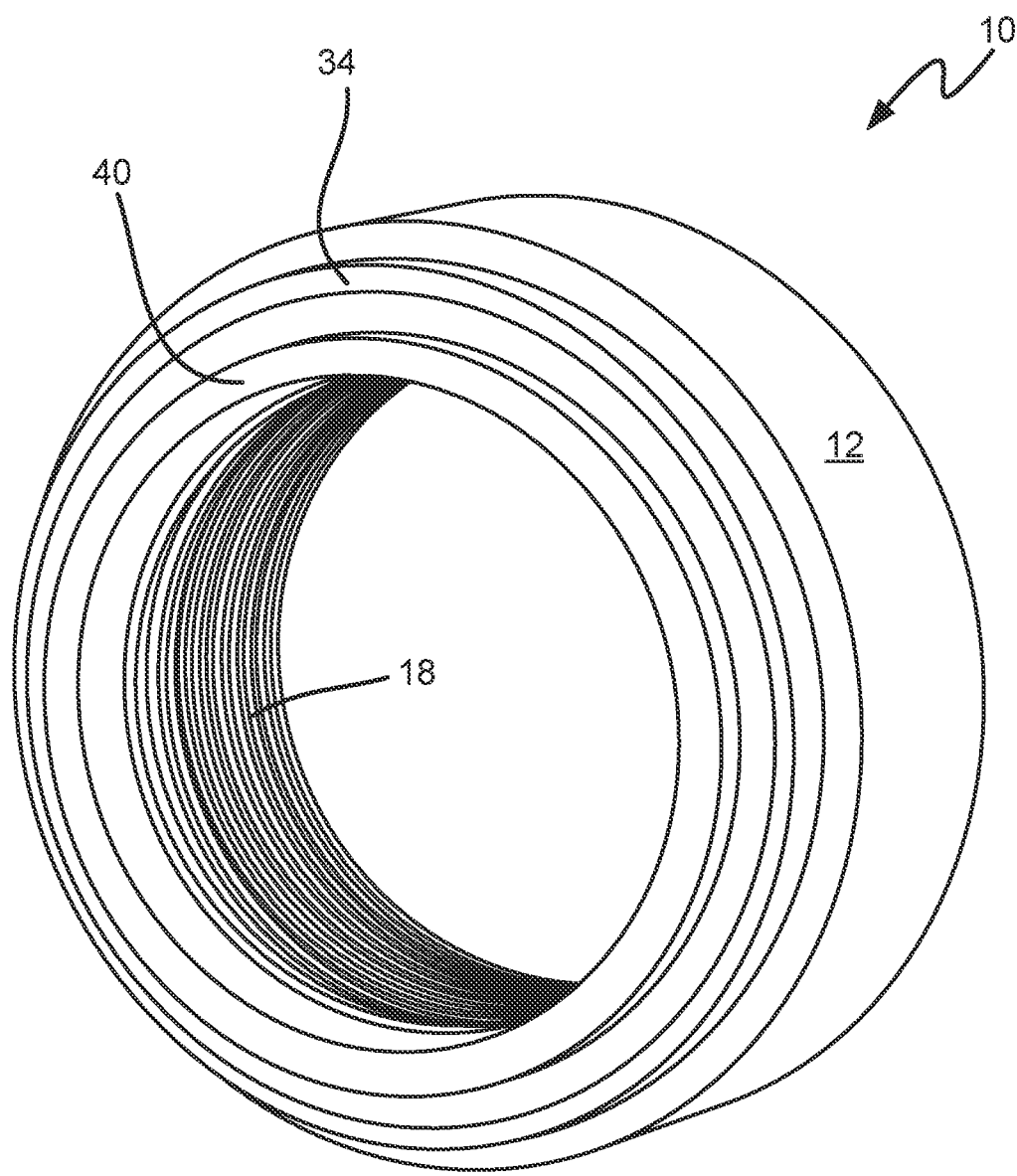
FIG. 1 is an isometric view of a bellows seal assembly of the present disclosure.
Figure 2:
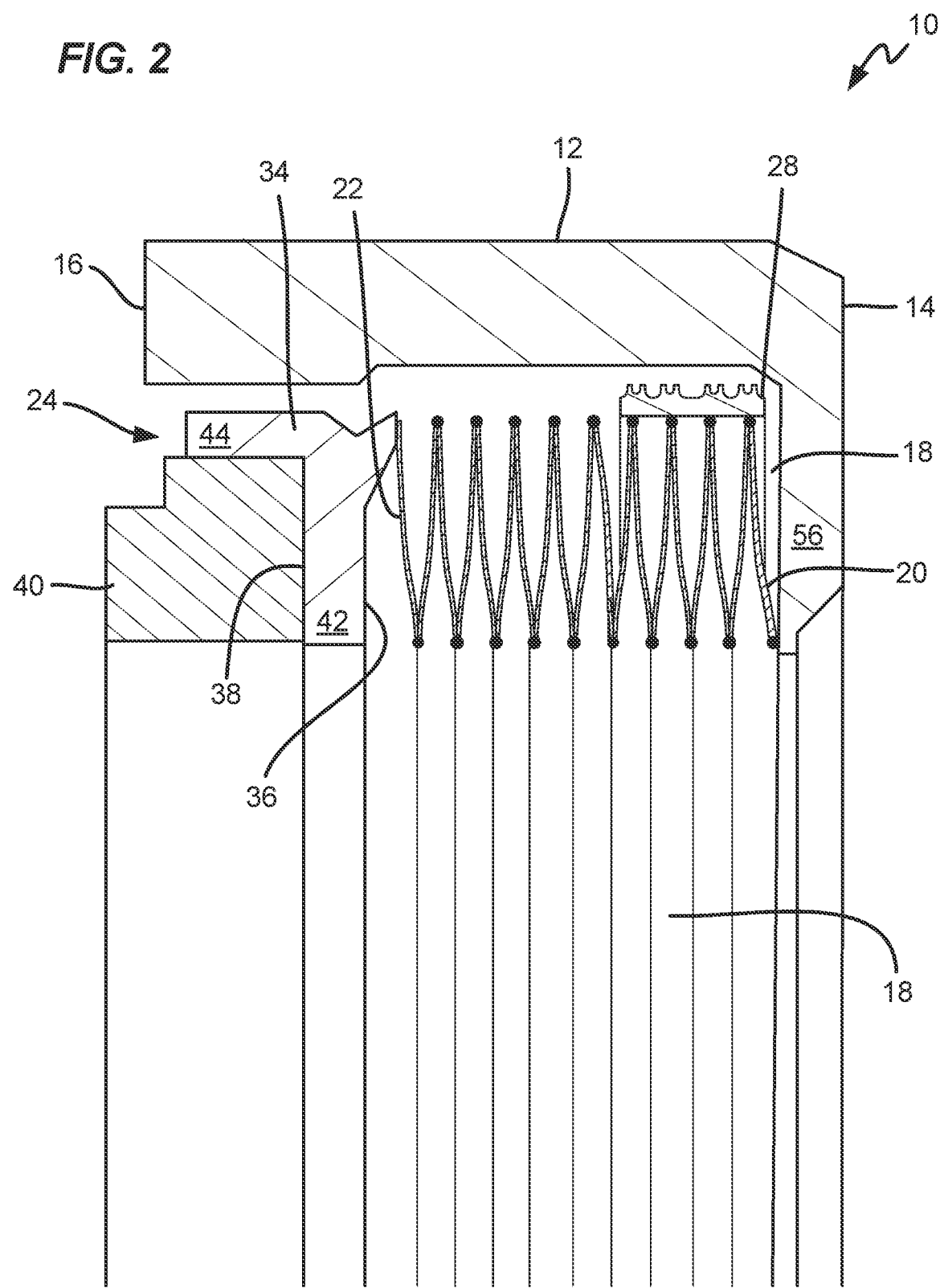
FIG. 2 is a partial cross-sectional view of the bellows seal assembly of FIG. 1.
Figure 3:
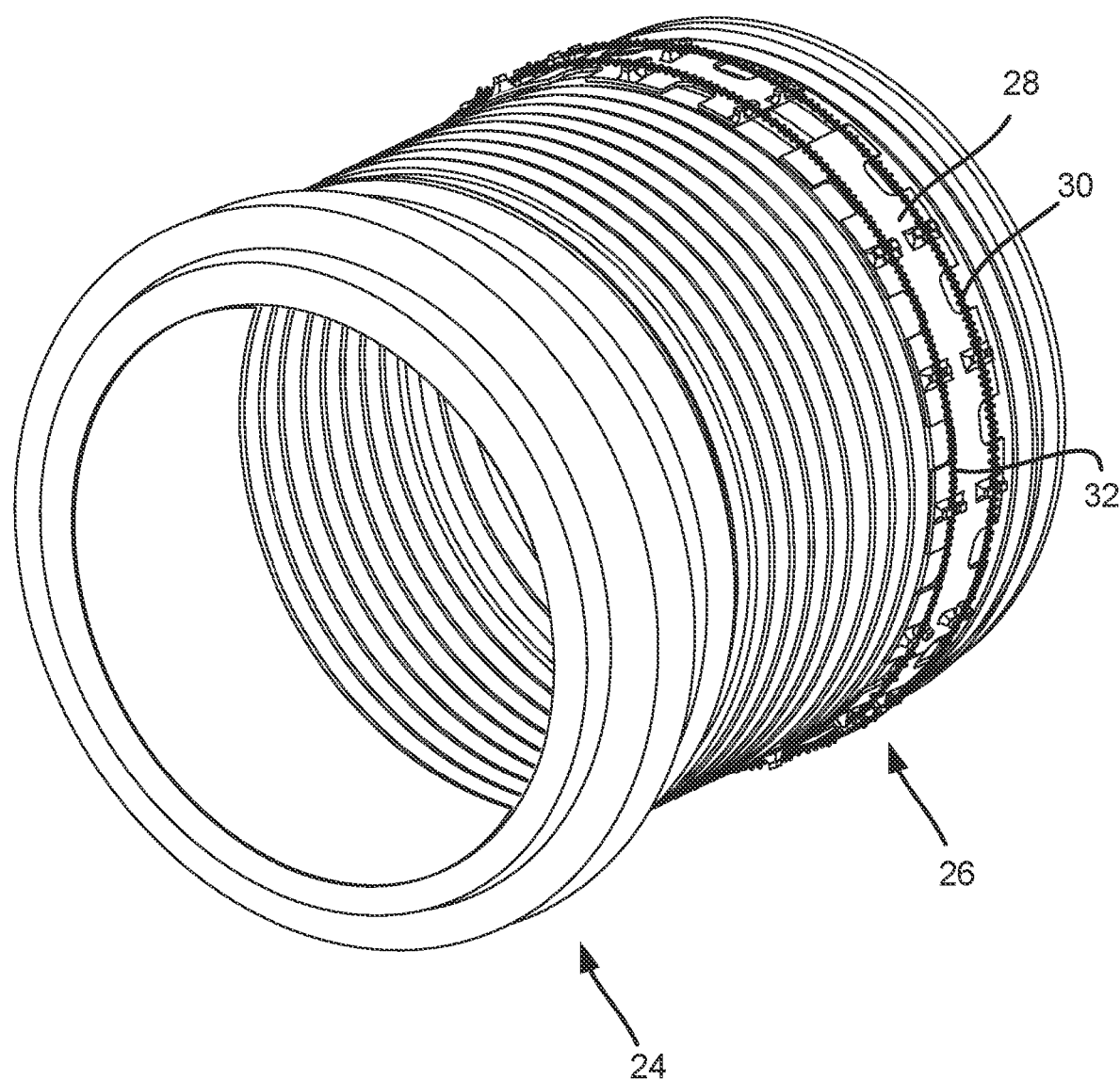
FIG. 3 is an isometric view of an internal portion of the bellows seal assembly of FIG. 1.
Figure 4:
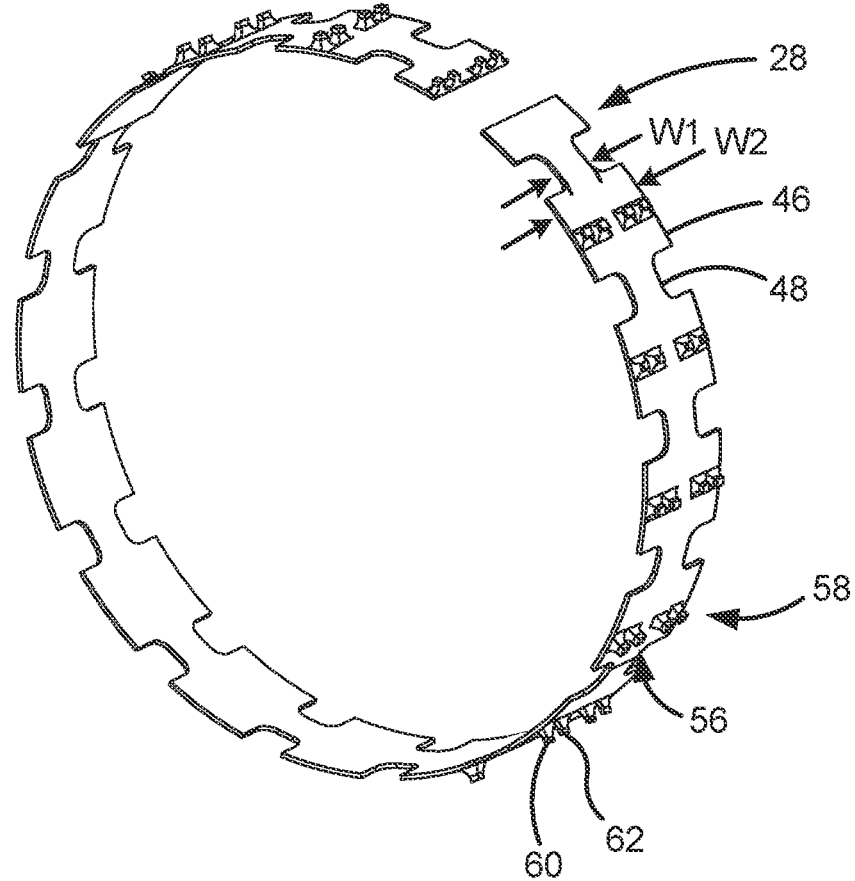
FIG. 4 is an isometric view of a portion of the damper assembly of the bellows seal assembly of FIG. 1.

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 6:
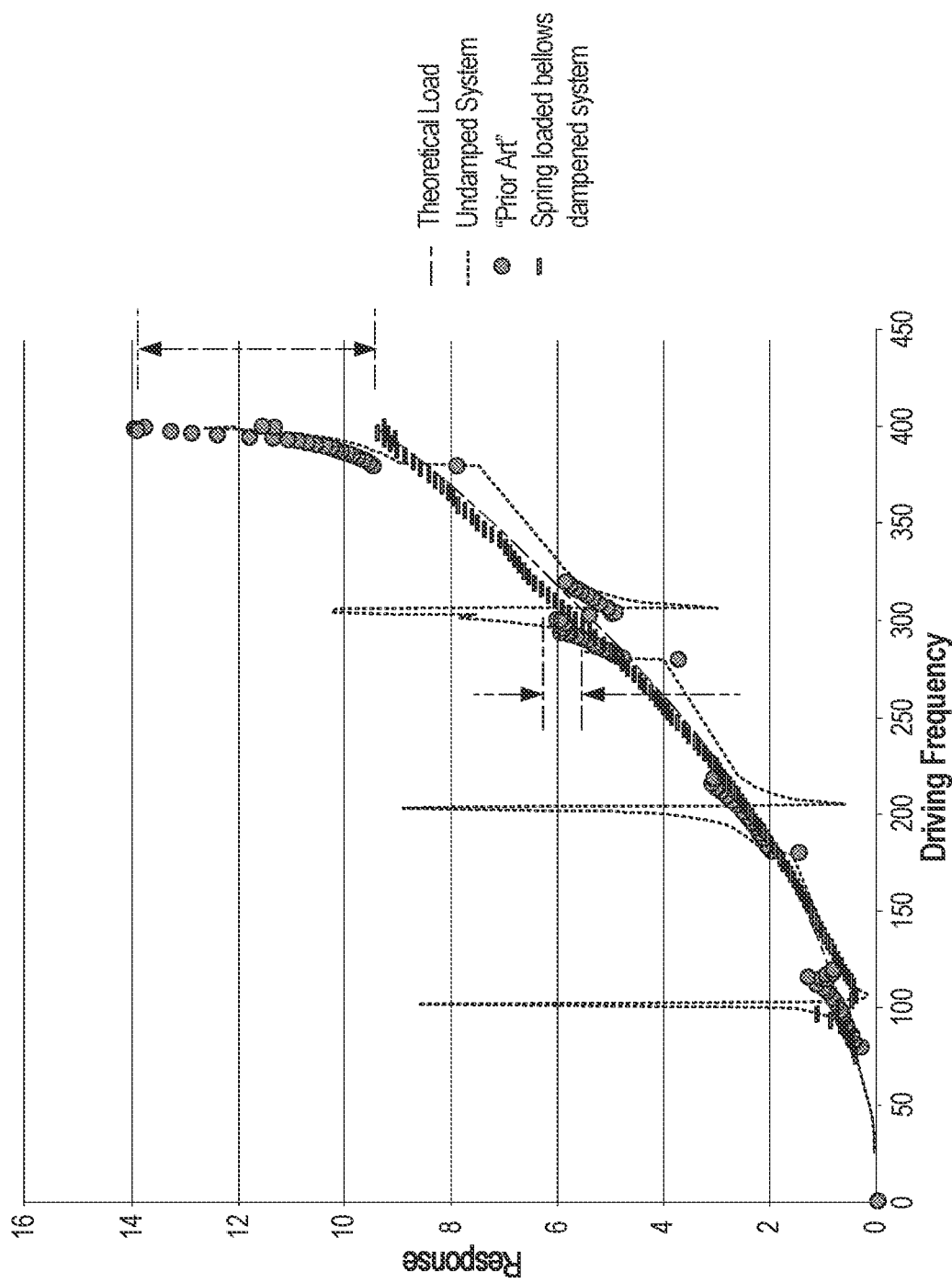
FIG. 6 is a graph illustrating load on the seal as a function of driving frequency.

Referring to the figures, an embodiment of the bellows seal assembly of the present disclosure is described in further detail. The bellows seal assembly of the present disclosure proves an improved seal. As discussed above, the seal of the present disclosure has improved longevity and can withstand harsher working conditions. In the depicted embodiment, the magnitude of the load on the seal is under ten pounds when the driving frequency is as high as 400 Hertz. When the driving frequency is at 400 Hertz, the load on the similarly sized prior art seals would typically be as high as twelve pounds or even greater (e.g., fourteen pounds). See FIG. 6 comparing the load on the seal as a function of driving frequency for an undamped system, a prior art system, and a spring loaded damped system according to the principles of the present disclosure.

In the depicted embodiment, the bellows seal assembly 10 includes a cylindrical main housing 12 including a first end 14 and a second end 16. The housing 12 includes an inwardly extending radial flange 56 at the first end 14. In the depicted embodiment, the main housing 12 is constructed of a heat resistant material. It should be appreciated that many other alternative configurations are possible. For example, alternatively, the housing can have a very different shape or have a multi-piece construction.

The bellows seal assembly 10 includes a cylindrical bellows 18 including a first end 20 and a second end 22. The first end 20 of the cylindrical bellows 18 is connected to the inside of the cylindrical main housing 12 at the inwardly extending radial flange 56 at the first end 14 of the cylindrical main housing 12. In the depicted embodiment, the bellows 18 is a welded bellows type bellows. In the depicted embodiment, the main housing 12 is constructed of a heat resistant material. In the depicted embodiment, the main housing 12 is constructed of a metal such as steel. It should be appreciated that many other alternative configurations are possible.

The bellows seal assembly 10 includes a ring seal 24 coaxially arranged with the bellows 18 and connected to the second end 22 of the bellows 18. In the depicted embodiment, the ring seal 24 is a face seal type seal. In the depicted embodiment, the ring seal 24 includes an annular ring seal housing 34 including a first side 36 and a second side 38. In the depicted embodiment, the first side 36 of the annular ring seal 24 is connected to the second end 22 of the bellows 18, and the second side 38 of the annular ring seal 24 is connected to a carbon insert 40. In the depicted embodiment, the carbon insert 40 is a carbon-graphite type sealing element. In the depicted embodiment, the ring seal housing 34 has an L-shaped cross-section with a radial extending ring portion 42 and an axial extending ring portion 44. In the depicted embodiment, the carbon insert 40 is pressed into the axial extending ring portion 44. In the depicted embodiment, the annular ring seal housing 34 is constructed of a heat resistant material. In the depicted embodiment, the annular ring seal housing 34 has a metal construction. It should be appreciated that many other alternative configurations are possible.

The bellows seal assembly 10 of the present disclosure includes a damper assembly 26. In the depicted embodiment, the damper assembly 26 includes a band 28 that wraps around an exterior portion of the cylindrical bellows 18. The damper assembly 26 includes a circumferential spring 30 that biases the band 28 radially against the exterior portion of the bellows 18. In the depicted embodiment, the circumferential spring 30 is a first circumferential spring 30 and the damper assembly 26 includes a second circumferential spring 32 that engages the band 28. In the depicted embodiment, the first circumferential spring 30 and the second circumferential spring 32 are offset and parallel to each other. In the depicted embodiment, the first and second circumferential springs 30, 32 are metal coil springs. It should be appreciated that many other alternative configurations are possible. For example, the springs can be different, they may be more or less springs, or the band itself could be configured to function as a spring that bias itself against the bellows.

In the depicted embodiment, the band 28 includes wide portions 46 separated by narrow portions 48. In the depicted embodiment, the band 28 has a minimum width W1 of between 3 millimeters and 10 millimeters and a maximum width W2 of between 10 millimeters and 35 millimeters. In the depicted embodiment, the band 28 of the damper has minimum with width of between 2 millimeters and 7 millimeters and a maximum with of between 7 millimeters and 35 millimeters. In the depicted embodiment, the band 28 of the damper assembly 26 has a maximum width of between 7 millimeters and 25 millimeters. In the depicted embodiment, the band 28 of the damper assembly 26 has a maximum width of between 15 millimeters and 25 millimeters. It should be appreciated that many other alternative configurations are possible. The band 28 could alternatively, for example, have a consistent width or the band 28 could have an hourglass shape with ever changing widths along its length. It should be appreciated that many other alternative configurations are possible.

Figure 5:
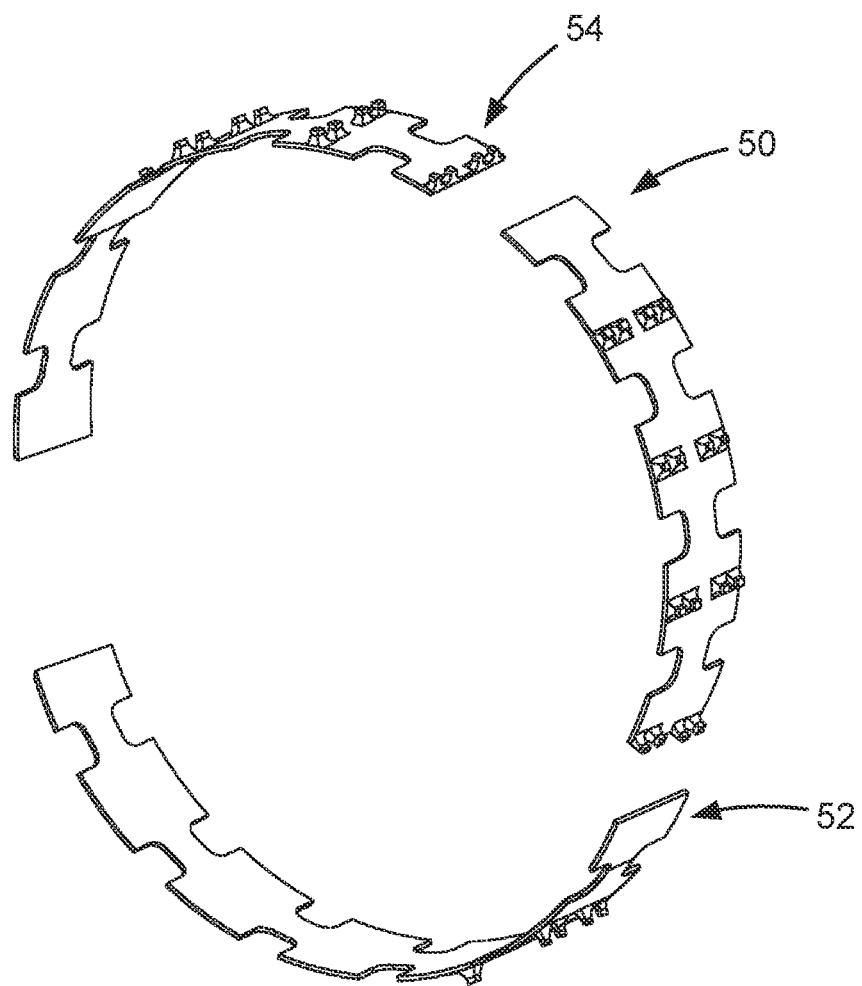
FIG. 5 is an isometric view of an alternative embodiment of a component of the damper assembly of FIG. 4.

In the depicted embodiment, the band 28 is a first band 50. In the depicted embodiment, the first band 50 has a length that is less than half of an exterior circumference dimension of the cylindrical bellows 18. In the depicted embodiment, the damper assembly 26 includes a second band 52 and a third band 54; the first band 50, the second band 52, and the third band 54 are aligned end to end and engaged with the circumferential spring 30. See FIG. 5. In the depicted embodiment, the first, second and third bands 50, 52, 54 have a heat resistance construction. In the depicted embodiment, the first, second and third bands 50, 52, 54 have a metal construction. In the depicted embodiment, the first, second and third bands 50, 52, 54 have a length that is less than one third of an exterior circumference dimension of the cylindrical bellows 18. It should be appreciated that many other alternative configurations are possible. In an embodiment where the first, second and third bands 50, 52, 54 are segmented into more than one piece, the pieces need not have the same length. For example, the first, second and third bands 50, 52, 54 can be made up of two segments wherein one segment is longer than the other segment. Many other configurations are also possible.

In the depicted embodiment, the first circumferential spring 30 is engaged with axial spring retainers 58 on the exterior of the band 28. The second circumferential spring 32 is engaged with axial spring retainers 58 on the exterior of the band 28. It should be appreciated that many other alternative configurations are possible. In the depicted embodiment, the axial spring retainers 58 are raised U-shaped structures that are sized to retain a portion of the circumferential spring 30, 32. The axial spring retainers 58 prevent the spring 30, 32 from sliding axially relative to the band 28. In the depicted embodiment, the axial spring retainers 58 include radially extending bosses 60, 62. In the depicted embodiment, the space between the bosses 60, 62 corresponds to the diameter of the coil spring 30, 32. In the depicted embodiment, the retainers 58 are metal and welded onto the band 28. It should be appreciated that many other alternative configurations are possible.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A bellows seal assembly comprising:
   a cylindrical main housing including a first end and a second end;

a cylindrical bellows including a first end and a second end, the first end of the cylindrical bellows connected to an inside of the cylindrical main housing at the first end of the cylindrical main housing;
a ring seal coaxially arranged with the bellows and connected to the second end of the bellows; and
a damper assembly, the damper assembly including:
a band that wraps around an exterior portion of the cylindrical bellows; and
a circumferential spring that biases the band radially against the exterior portion of the bellows;
wherein the circumferential spring is a first circumferential spring and the damper assembly includes a second circumferential spring that engages the band, the first circumferential spring and the second circumferential spring being offset and parallel to each other.

2. The bellows seal assembly of claim 1, wherein the ring seal is a face seal type seal.

3. The bellows seal assembly of claim 2, wherein the ring seal includes an annular ring seal housing including a first side and a second side, the first side of the annular ring seal housing being connected to the second end of the bellows, and the second side of the annular ring seal housing being connected to a carbon insert.

4. The bellows seal assembly of claim 3, wherein the ring seal housing has an L-shaped cross-section with a radial extending ring portion and an axial extending ring portion, the carbon insert being pressed into the axial extending ring portion.

5. The bellows seal assembly of claim 3, wherein the main housing and annular ring seal housing have a metal construction.

6. The bellows seal assembly of claim 3, wherein the carbon insert is a carbon-graphite type sealing element.

7. The bellows seal assembly of claim 1, wherein the band of the damper assembly includes wide portions separated by narrow portions.

8. The bellows seal assembly of claim 7, wherein the band of the damper assembly has a minimum width of between 3 millimeters and 10 millimeters and a maximum width of between 10 millimeters and 35 millimeters.

9. The bellows seal assembly of claim 7, wherein the band of the damper assembly has a minimum width of between 2 millimeters and 7 millimeters and a maximum between 7 millimeters and 35 millimeters.

10. The bellows seal assembly of claim 1, wherein the band of the damper assembly has a maximum width of between 7 millimeters and 25 millimeters.

11. The bellows seal assembly of claim 1, wherein the band of the damper assembly has a maximum width of between 15 millimeters and 25 millimeters.

12. The bellows seal assembly of claim 1, wherein the band of the damper assembly is a first band, wherein the damper assembly further comprises at least a second band, the first band and the second band being aligned end to end and engaged with the circumferential spring.

13. The bellows seal assembly of claim 1, wherein the band of the damper assembly has a length that is less than half of an exterior circumference dimension of the cylindrical bellows.

14. The bellows seal assembly of claim 1, wherein the band of the damper assembly has a length that is less than one third of an exterior circumference dimension of the cylindrical bellows.

15. The bellows seal assembly of claim 1, wherein the circumferential spring is a metal coil spring.

16. The bellows seal assembly of claim 1, wherein the bellows is a welded bellows type bellows.

17. The bellows seal assembly of claim 1, wherein a load on the ring seal is under ten pounds when a driving frequency is under 400 Hertz.

18. The bellows seal assembly of claim 1, wherein the band is a first band, wherein the damper assembly further comprises at least a second band, the first and the second bands being axially aligned end to end and in contact with the circumferential spring.

19. A face type bellows seal assembly comprising:
a metal cylindrical main housing including a first end and a second end;
a metal cylindrical welded bellows including a first end and a second end, wherein the first end of the cylindrical welded bellows is connected to an inwardly extending radial flange of the cylindrical main housing at the first end of the cylindrical main housing;
a metal annular ring seal housing including an L-shaped cross-section with a radial extending ring portion and an axial extending ring portion, the axial extending ring portion being connected to the second end of the cylindrical welded bellows;
a carbon graphite insert pressed into the axial extending ring portion of the annular ring seal housing; and
a damper assembly positioned around a portion of the cylindrical welded bellows, wherein the circumferential damper assembly includes:
a band, the band including at least two wide portions separated by narrow portions, the narrow portions having a width of between 3 millimeters to 10 millimeters and the wide portions having a width of between 10 millimeters to 35 millimeters;
a first metal circumferential coil spring that biases the band radially against an exterior of the cylindrical welded bellows, the first circumferential spring engaged with the axial spring retainers on the exterior of the band; and
a second circumferential metal coil spring that engages with the axial spring retainers on the exterior of the band, the first and the second circumferential springs being offset axially and positioned parallel to each other.

20. A bellows seal assembly comprising:
a cylindrical main housing including a first end and a second end;
a cylindrical bellows including a first end and a second end, the first end of the cylindrical bellows connected to an inside of the cylindrical main housing at the first end of the cylindrical main housing;
a ring seal coaxially arranged with the bellows and connected to the second end of the bellows; and
a damper assembly, the damper assembly including:
a band that wraps around an exterior portion of the cylindrical bellows; and
a circumferential spring that biases the band radially against the exterior portion of the bellows;
wherein the band is a first band, wherein the damper assembly further comprises at least a second band, the first band and the second bands being aligned end to end and engaged with the circumferential spring.

21. A bellows seal assembly comprising:
a cylindrical main housing including a first end and a second end;
a cylindrical bellows including a first end and a second end, the first end of the cylindrical bellows connected to an inside of the cylindrical main housing at the first end of the cylindrical main housing;

a ring seal coaxially arranged with the bellows and connected to the second end of the bellows; and a damper assembly, the damper assembly including:
 a band that wraps around an exterior portion of the cylindrical bellows; and
 a circumferential spring that biases the band radially against the exterior portion of the bellows;

wherein the band has a length that is less than half of an exterior circumference dimension of the cylindrical bellows.

22. A bellows seal assembly comprising:

a cylindrical main housing including a first end and a second end;

a cylindrical bellows including a first end and a second end, the first end of the cylindrical bellows connected to an inside of the cylindrical main housing at the first end of the cylindrical main housing;

a ring seal coaxially arranged with the bellows and connected to the second end of the bellows; and a damper assembly, the damper assembly including:
 a band that wraps around an exterior portion of the cylindrical bellows; and
 a circumferential spring that biases the band radially against the exterior portion of the bellows;

wherein the band has a length that is less than one third of an exterior circumference dimension of the cylindrical bellows.

23. A bellows seal assembly comprising:

a cylindrical main housing including a first end and a second end;

a cylindrical bellows including a first end and a second end, the first end of the cylindrical bellows connected to an inside of the cylindrical main housing at the first end of the cylindrical main housing;

a ring seal coaxially arranged with the bellows and connected to the second end of the bellows; and a damper assembly, the damper assembly including:
 a band that wraps around an exterior portion of the cylindrical bellows; and
 a circumferential spring that biases the band radially against the exterior portion of the bellows;

wherein the circumferential spring is a metal coil spring.

* * * * *